United States Patent

Hagbjer et al.

[11] 4,195,713
[45] Apr. 1, 1980

[54] SANDWICH STRUCTURES WITH PARTIAL DAMPING LAYERS

[75] Inventors: Gunnar I. Hagbjer, Malmö; Odd B. Sylwan, Stockholm, both of Sweden

[73] Assignee: Reduc Acoustics AB, Perstorp, Sweden

[21] Appl. No.: 943,227

[22] Filed: Sep. 18, 1978

Related U.S. Application Data

[63] Continuation of Ser. No. 820,334, Jul. 29, 1977, abandoned, which is a continuation of Ser. No. 700,070, Jun. 28, 1976, abandoned, which is a continuation of Ser. No. 579,583, May 21, 1975, abandoned.

[30] Foreign Application Priority Data

May 30, 1974 [SE] Sweden .............................. 7407074

[51] Int. Cl.² .............................................. F16F 7/10
[52] U.S. Cl. .................................... 188/1 B; 181/208; 248/632
[58] Field of Search ................... 52/396, 433; 74/574; 181/207–209; 188/1 B; 248/22, 663

[56] References Cited

U.S. PATENT DOCUMENTS

| 2,173,797 | 9/1939 | Toohey et al. ...................... 181/208 |
| 2,256,984 | 9/1941 | Lemen et al. ...................... 248/22 X |
| 2,573,482 | 10/1951 | Peik ........................................ 52/443 |
| 3,087,567 | 4/1963 | Kurtze .................................. 181/208 |
| 3,144,228 | 8/1964 | Kass ...................................... 248/663 |
| 3,262,521 | 7/1966 | Warnaka ............................... 188/1 B |
| 3,436,042 | 4/1969 | Van Goubergen ................ 248/22 X |

FOREIGN PATENT DOCUMENTS

952726 11/1949 France ..................................... 181/207

*Primary Examiner*—Duane A. Reger
*Attorney, Agent, or Firm*—Burns, Doane, Swecker & Mathis

[57] ABSTRACT

According to the invention the damping of vibration on the part of a structural material such as metal or concrete is effected by applying a limited amount of vibration-damping viscoelastic material between the two such structural parts, the vibration-damping material being being applied in lines, points or the like spaced from each other at distances less than one bending wavelength for the highest frequency range to be damped.

5 Claims, 8 Drawing Figures

SANDWICH STRUCTURES WITH PARTIAL DAMPING LAYERS

This is a continuation of application Ser. No. 820,334, filed July 29, 1977, now abandoned, which is a continuation of Ser. No. 700,070, filed June 28, 1976, now abandoned which is a continuation of Ser. No. 579,583, filed May 21, 1975, now abandoned.

The invention relates to damped structures of, e.g., metal, concrete, lightweight concrete, plaster, wood, wood fibres, plastic, or combination of these materials.

It is previously known to damp plates by a so-called sandwich method, i.e., by applying a thin layer of viscoelastic material between two plates. Through the Swedish Pat. No. 344,093 (corresponding to U.S. Pat. No. 3,828,504) concrete or lightweight concrete structures damped correspondingly are also known, wherein a layer of viscoelastic material being very thin in relation to the concrete of lightweight concrete structure is applied between two parts of the structure. In such a structure is utilized the ability of the viscoelastic material to transform a great part of the vibration energy into heat when subjected to shearing between the two structure parts by their bending due to vibration.

A maximum shearing in the damping layer and thereby a maximum damping of the structure is obtained when the damping layer is placed into or near the neutral plane of the homogeneous structure. In case the same material is used on both sides of the damping layer, e.g. plate-damping layer-plate, this means that the damping layer should be placed so that the total stiffness of a structure damped in this way should be substantially evenly distributed on both sides of the viscoelastic layer.

In the known structures the viscoelastic material is evenly distributed in a thin layer over the entire contact surface between the two structure parts.

The most effective viscoelastic materials are characterized by an extremely high loss factor ($>1.0$), high adhesion—it functions as glue between the structure parts—suitable consistence, etc. These viscoelastic materials are expensive.

Adaptation of the viscoelastic damping layer to a structure in order to obtain maximum damping is carried out by varying the layer thickness and shear modulus ($10^5$–$10^9$ N/m$^2$, preferably $10^6$–$10^8$ N/m$^2$) of the damping layer. In practice these parameters can be varied only within comparatively narrow limits. For the most effective materials the shearing rigidity of the layer cannot be made low enough with retained other desirable properties. Inter alia, the consistency will be unsuitable (the layer material sticks to the tools during the process) and the adhesion poor.

The application of the damping material is rather time-consuming. When applying to plates, particle boards, etc., there is a risk of uncontrolled air enclosements.

The aforesaid inconveniences are solved by the present invention, the idea of which is to replace the entirely covering viscoelastic damping layer with a partially covering layer. Thereby it is also possible to replace the stiffness of one structure part by a corresponding stiffness with partial covering, i.e., with one or preferably several structure parts being in connection with the other structure part via the viscoelastic damping layer. For the sake of simplicity one of the structure parts is hereinafter referred to as the upper slab and the other structure part as the lower slab.

Very good damping results are achieved with a partially covering thin damping layer of suitable viscoelastic material having a high loss factor ($>0.5$) and a comparatively high shearing rigidity (compared to totally covering layers) up to frequencies where the bending wavelength of the damped structure is greater than the distance between the portions covered by damping material. Investigations have shown that the damping of the structure becomes equally high as a corresponding one with entirely covering damping layers.

The upper slab can be replaced by a partial covering framework, or the like, placed onto the lower slab, the stiffness of the upper slab being of the same magnitude as that of the lower slab (within the same 10-power).

Alternatively, a framework or the like, having the above properties, can be cast-in in the upper and/or the lower edge of the lower slab.

The viscoelastic damping layer can be applied in the form of lines, strips, networks, points, or combinations of these, preferably having a material thickness between about 0.1 mm and 2 mm. Hereby it is possible to vary the stiffness continuously of the entire damping layer, i.e., its total area, for instance by varying the number of points or their size in order to adapt hereby the damping features of a structure to desired values. Tests have shown that it is possible to obtain the same damping with a covering of 10% as by an entirely covering layer, if the aforesaid conditions as to the distance between the covered portions and the adaptation of the shearing rigidity of the damping layer are fulfilled.

Because a viscoelastic damping material is active within a limited temperature range, it has hitherto been impossible to achieve a perfect damping within a wider temperature range. By the partial application according to the invention it will be possible to widen the temperature range, within which a structure is efficiently damped, by alternately applying several viscoelastic materials, each of them having different temperature dependency of the shearing modulus.

It has hitherto presented difficulties to work damped plates, so-called sandwich plates. By drilling, e.g., the viscoelastic material has stuck to the drill, and welding has involved some problems. By applications, e.g. point by point of the damping layer according to the invention, there are considerably greater possibilities to work on a sandwich slab, as the positions of the points can be marked on the upper side of the plate and the treatment mostly can be carried out within the areas not covered by damping material.

The application of a partial covering layer according to the invention can simply be carried out, either in the form of lines, points or network, by automatic dosing devices, and the right layer thickness can be obtained by pressing or rolling an upper slab or similar against a lower one. Hence it follows that the working effort for applying a partial damping layer according to the invention is considerably less than for applying an entirely covering layer as per conventional technique.

Because a slab or plate according to the invention can be replaced by a framework or similar having the same stiffness, sufficient stiffness can be achieved, as the stiffness increases by the cube of height, with comparatively small material consumption and, thus, low structure weight.

A further development of the inventive idea implies that one slab is replaced by, e.g., reinforcement bars provided with thin viscoelastic damping layers, the bars being inserted in the other slab near the surface thereof and allowed to shear. The bars are thereby wholly or partly provided with a layer of a damping viscoelastic material.

When casting a damped concrete structure with partially covering damping layer according to the invention it is possible, in order to avoid the two slabs to be cast together on places not covered by damping layers, to place on the lower slab a covering sheet, e.g., of sheathing paper or plastic foil with apertures at the location of the damping layer. Alternatively, the damping layer can be applied partially on one or both sides of a carrier (e.g., sheathing paper).

The invention is described in the following with some examples with reference to the enclosed drawings, wherein.

Figure 1:
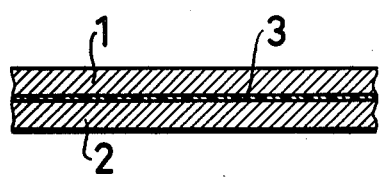
FIG. 1 shows a section of a conventionally damped structure.

In FIG. 1 a conventionally damped structure is shown, consisting of, e.g., two plates, concrete slabs, plaster sheets, wooden fibre sheets or the like, 1 and 2, between which a thin continuous layer 3 of viscoelastic material is applied.

Figure 2:
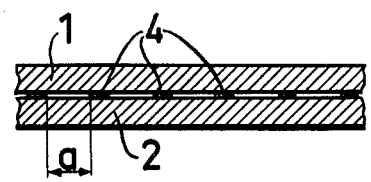
FIG. 2 shows in the same way the principle of damping according to the invention.

The damped structure according to the invention (FIG. 2) may comprise the same plates, etc., 1 and 2, but has a partially covering damping layer, consisting of distributed lines or points 4 of viscoelastic material. The distance a between these lines or points 4 is according to the invention preferably less than one wavelength for the highest frequency range, within which the structure should be efficiently damped, and rather less than a third of the wavelength within the same range.

Figure 3:
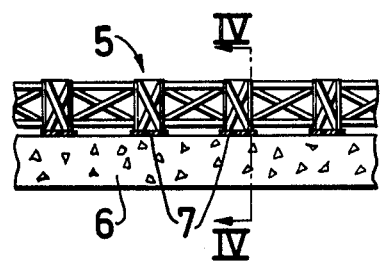
FIGS. 3 and 4 show two sections perpendicular to each other through a concrete structure, wherein the upper slab is replaced by a framework structure.
Figure 4:
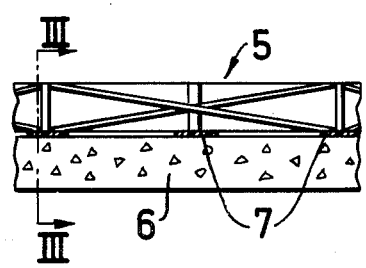

In FIGS. 3 and 4 shown how according to the invention the stiffness of a slab can be replaced by a corresponding stiffness, here in the form of a framework 5 of, e.g. wood, which is arranged upon a concrete slab 6. A damping layer in the form of points 7 is arranged between the framework and the concrete slab.

Figure 5:
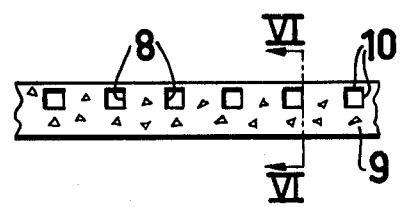
FIGS. 5 and 6 show the sections perpendicular to each other through a concrete structure, the stiffness from the upper slab being cast into the lower slab in the form of a framework roughly shown.
Figure 6:
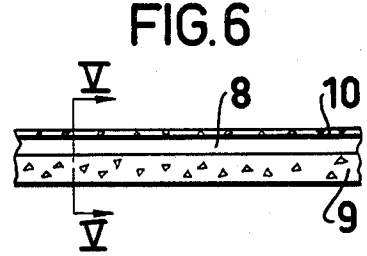

In FIGS. 5 and 6 is shown how according to a further development of the invention idea the stiffness of the upper slab in the form of a framework 8 is worked down into the lower slab 9. Around the whole framework or parts of it, herein shown as boxlike girders, a layer of viscoelastic damping material 10 is applied.

Figure 7:
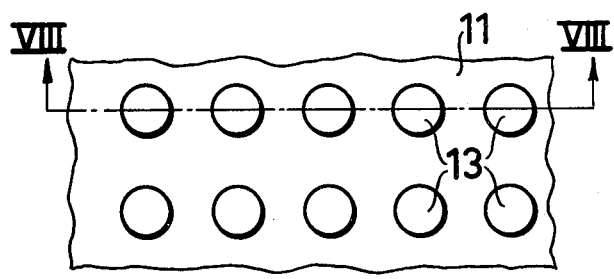
FIG. 7 shows from above a part of a concrete structure in production.
Figure 8:
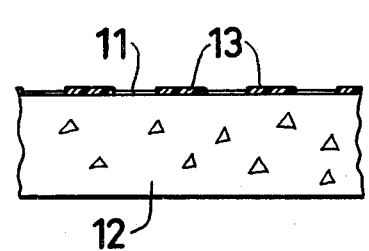
FIG. 8 shows a section along the line VIII—VIII of FIG. 7.

When producing a damped concrete structure according to the invention, e.g., a sheet of sheathing paper 11 (FIG. 7) can be used, which is placed onto the first cast slab 12, whereupon apertures suitably distributed in the sheet are filled with damping material 13 (FIG. 8). Thereafter, the upper slab, not shown here, can be cast.

In the inventive idea is included also such a structure on which, for practical reasons, an entirely covering damping layer is applied, but only parts of the layer are used for damping owing to the replacement of the upper slab (one of the slabs) by a partial stiffness.

We claim:

1. A damped composite structure including:
   two rigid structural parts, at least one of the structure parts having a continuous surface facing the other part,
   a plurality of spaced, discrete energy absorbing units of a viscoelastic material having a loss factor greater than 0.50, each of said units adhering to the facing surfaces of the structural parts and together forming a thin discontinuous layer of viscoelastic material having a thickness ranging from about 0.10 to 2.0 millimeters, the greatest distance between the units being less than the bending wavelength for the highest frequency to be damped, wherein the viscoelastic material absorbs energy when subjected to shearing due to relative lengthwise movement between the structural parts when subjected to bending waves.

2. The energy absorbing units of claim 1 wherein the discrete units of the damping material are spaced to form a network.

3. The structure of claim 1 wherein a non-viscoelastic sheet having a plurality of apertures is disposed between the facing surfaces of the structural parts, the energy absorbing units extending through the apertures.

4. The structure of claim 1 wherein the energy absorbing units are carried by a non-viscoelastic sheet disposed between the facing surfaces of the structural parts.

5. The structure of claim 4 wherein the non-viscoelastic sheet is a plastic foil.

* * * * *